US007805497B2

(12) United States Patent
McCoy

(10) Patent No.: US 7,805,497 B2
(45) Date of Patent: Sep. 28, 2010

(54) METHOD AND PRODUCT FOR CALCULATING A NET OPERATING INCOME AUDIT AND FOR ENABLING SUBSTANTIALLY IDENTICAL AUDIT PRACTICES AMONG A PLURALITY OF AUDIT FIRMS

(75) Inventor: Mary Kay McCoy, Tarrytown, NY (US)

(73) Assignee: General Electric Capital Corporation, Stamford, CT (US)

( * ) Notice: Subject to any disclaimer, the term of this patent is extended or adjusted under 35 U.S.C. 154(b) by 394 days.

(21) Appl. No.: 12/060,688

(22) Filed: Apr. 1, 2008

(65) Prior Publication Data

US 2009/0106254 A1 Apr. 23, 2009

Related U.S. Application Data

(63) Continuation of application No. 09/731,008, filed on Dec. 7, 2000, now Pat. No. 7,353,228.

(51) Int. Cl.
*G06F 15/16* (2006.01)
*G06Q 50/00* (2006.01)

(52) U.S. Cl. .................. 709/217; 715/738; 707/802; 707/999.1; 705/313

(58) Field of Classification Search .............. 235/375, 235/376, 385; 345/418, 419, 581, 588; 705/30, 705/313; 707/792, 802, 999.01, 999.001, 707/999.1; 709/202, 217, 228; 715/221, 715/234, 235, 736, 738

See application file for complete search history.

(56) References Cited

U.S. PATENT DOCUMENTS 4,752,457 A 6/1988 Toriyama et al.

(Continued)

OTHER PUBLICATIONS

Arthur Middleton Hughes, "Database Marketing Institute, How Profitability Analysis is Used in Financial Services Marketing", Aug. 7, 2001, wysiwyg://69/http://www.dbmarketing.com/articles/Art176.htm, 3pgs.

(Continued)

*Primary Examiner*—Andrew Joseph Rudy
(74) *Attorney, Agent, or Firm*—Buckley, Maschoff & Talwalkar LLC

(57) ABSTRACT

Deployment of a computer program including a global NOI audit model together with standards, procedures, documentation, and reporting requirements in interactive, digital form to a plurality of audit firms operating independently of each other and having a reporting relationship with an investment entity. The program is adapted for receiving audit data from a respective audit firm in connection with an associated real estate property and for generating an associated respective Current NOI audit report. The specific fields and screen arrangements, together with interactive instructions and definitions of the program require that each audit firm identify a consistent set of input parameters and apply them in a consistent way, as driven by the global audit model, thereby assuring computation and transmission of structurally consistent Current NOI audit reports to the investment entity, wherein the Current NOI calculations have been developed by substantially identical audit practices, procedures and assumptions. Using the same program, the investment entity then calculates and stores an Underwriting NOI set of values corresponding to each Current NOI report for the purpose of investment evaluation. The program generates a consolidated report of both Current and Underwriting NOI values for all of the plurality of audit firms so that the investment entity can effect a uniform analysis of all investment properties under consideration.

8 Claims, 17 Drawing Sheets

U.S. PATENT DOCUMENTS

| | | | |
|---|---|---|---|
| 4,823,914 | A | 4/1989 | McKinney et al. |
| 4,989,141 | A | 1/1991 | Lyons et al. |
| 5,220,500 | A | 6/1993 | Baird et al. |
| 5,371,675 | A | 12/1994 | Greif et al. |
| 5,752,237 | A | 5/1998 | Cherny |
| 5,765,138 | A | 6/1998 | Aycock et al. |
| 5,790,664 | A | 8/1998 | Coley et al. |
| 5,862,223 | A | 1/1999 | Walker et al. |
| 5,920,861 | A | 7/1999 | Hall et al. |
| 5,931,946 | A | 8/1999 | Terada et al. |
| 5,999,908 | A | 12/1999 | Abelow |
| 6,023,687 | A | 2/2000 | Weatherly et al. |
| 6,070,160 | A | 5/2000 | Geary |
| 6,154,725 | A | 11/2000 | Donner |
| 6,185,576 | B1 | 2/2001 | McIntosh |
| 6,192,347 | B1 | 2/2001 | Graff |
| 6,216,164 | B1 | 4/2001 | Zaremba, Jr. |
| 6,226,623 | B1 | 5/2001 | Schein et al. |
| 6,285,989 | B1 | 9/2001 | Shoham |
| 6,389,403 | B1 | 5/2002 | Dorak, Jr. |
| 6,397,195 | B1 | 5/2002 | Pinard et al. |
| 6,460,069 | B1 | 10/2002 | Berlin et al. |
| 6,484,176 | B1 * | 11/2002 | Sealand et al. .................... 1/1 |
| 6,484,315 | B1 | 11/2002 | Ziese |
| 6,542,905 | B1 | 4/2003 | Fogel et al. |
| 6,546,554 | B1 | 4/2003 | Schmidt et al. |
| 6,594,633 | B1 * | 7/2003 | Broerman .................... 705/313 |
| 6,643,625 | B1 | 11/2003 | Acosta et al. |
| 6,859,791 | B1 | 2/2005 | Spagna et al. |
| 6,871,140 | B1 | 3/2005 | Florance et al. |
| 6,957,196 | B1 | 10/2005 | Cordery et al. |
| 6,980,928 | B1 | 12/2005 | Graichen et al. |
| 7,054,833 | B1 | 5/2006 | McDonald |
| 7,058,685 | B1 | 6/2006 | van Zee et al. |
| 7,107,685 | B1 | 9/2006 | Anderson |
| 7,149,698 | B2 | 12/2006 | Guheen et al. |
| 7,596,511 | B2 * | 9/2009 | Hall et al. .................... 705/313 |
| 7,660,869 | B1 * | 2/2010 | Kitts ......................... 709/217 |

OTHER PUBLICATIONS

John E. Price et al., "College Accounting", Glencoe Macmillan/McGraw-Hill, Seventh Edition, Chapters 1-32, 1994, pp. 28-41, 529-531, 966-982 (38 pages total).

Edward Blocher, "Approaching Analytical Review", The CPA Journal (pre-1986), Mar. 1983; 53, 000003, ABI/INFORM Global, pp. 24, 26, 28, 30-32 (6 pages total).

O Keefe, Terrence B. et al., "Audit fees, industry specialization, and compliance with GAAS reporting standards", Auditing, Fall 1994, vol. 13, Iss. 2; p. 41 (12 pages total).

Jack P. Friedman, "Talking with Accountants about Income-Producing Real Estate", Real Estate Issues; Apr. 1995, vol. 20, Iss. 1; ABI/INFORM Global, pp. 41-47, 7pgs.

* cited by examiner

| | |
|---|---|
| SECTION A: STATIC & HISTORICAL INFORMATION<br>D E A L  D A T A<br>GENERAL ASSET INFORMATION<br>PRIOR INFORMATION | — 300<br>— A |
| COLUMN HEADING DISPLAYED ON SCHEDULES: | |
| NON-COMMERCIAL | |
| COMMERCIAL | |
| SECTION B: INCOME | — B |
| SCHEDULE 1.0 & 1.1: COMMERCIAL RENTAL INCOME / LEASE TESTING — 302 | |
| SCHEDULE 2.0: NON-COMMERCIAL LEASE TESTING | |
| SCHEDULE 3.0: COMMERCIAL AND NON-COMMERCIAL CASH TESTING | |
| SCHEDULE 4.0 & 4.1: COMMERCIAL RECOVERY ANALYSIS | |
| SCHEDULE 5.0: PERCENTAGE RENT TESTING | |
| SCHEDULE 6.0: NON-COMMERCIAL INCOME | |
| SCHEDULE 7.0: OTHER INCOME | |
| SECTION C: EXPENSE | |
| Schedule 8.0: REAL ESTATE TAX BILL | — C |
| Assessment Information | |
| Tax Bill Information | |
| Schedule 9.0: INSURANCE | |
| Schedule 10.0: UTILITIES | |
| Schedule 11.0: REPAIRS & MAINTENANCE | |
| Schedule 11.1: SERVICE CONTRACT TESTING | |
| SCHEDULE 12.0: MANAGEMENT FEES | |
| Schedule 13.0: GENERAL & ADMINISTRATIVE | |
| Schedule 14.0: ADVERTISING & PROMOTION | |
| Schedule 15.0: PROFESSIONAL FEES & SERVICES | |
| Schedule 16.0: PAYROLL EXPENSE | |
| Schedule 16.1: PAYROLL TESTING | |
| Schedule 17.0: FLEX 1 - ENTER DESCRIPTION | |
| Schedule 17.1: FLEX 2 - ENTER DESCRIPTION | |
| Schedule 18.0: NON-OPERATING EXPENSES | |
| U/W Reserve | |
| SECTION D: NOI AUDIT SUMMARY COMMENTS | — D |

FIG. 6

| SECTION B: INCOME | | |
|---|---|---|
| SCHEDULE 1.0 & 1.1: COMMERCIAL RENTAL INCOME / LEASE TESTING | Property #1 | |
| Average Current Market Rate PSF (base rent) | | |
| U/W Adjustment to Economic Occupancy % - enter +/- % | | |
| Audit Method | | |
| Rent Roll As Of Date: | | |
| Select Audit Method: | | |
| General Comments on Commercial Income Audit | | |
| Rental Income Comments - 1 (Note on Schedule 1.0) | | |
| Rental Income Comments - 2 (Note on Schedule 1.0) | | |
| Rental Income Comments - 3 (Note on Schedule 1.0) | | |
| If you selected "Total Rent Roll" as Audit Method, enter following information. Note: Using this section will override the Current NOI commercial income. Detailed backup calculation needs to be provided. | | |
| TSF | | |
| SF Occupied (Detail Backup Needs to be Provided) | | |
| Total Base Rental Income (Detail Backup Needs to be Provided) | | |
| Total Tax Recovery Income (Detail Backup Needs to be Provided) | | |
| Total Insurance Recovery Income (Detail Backup Needs to be Provided) | | |
| Total Op. Cost Recovery Income (Detail Backup Needs to be Provided) | | |
| Total Other Recovery Income (Detail Backup Needs to be Provided) | | |
| Total Amortized TI's (Detail Backup Needs to be Provided) | | |

FIG. 7

*Project Alpha Portfolio*             *XYZ Office Building*

400

CURRENT NOI AUDIT SUMMARY

Office:                                                            Prepared By: 
Property Location:   Anytown, CT            Reviewed & Approved By: 
Date of Audit:       06/20/00

422 —

| Commercial | | | | |
|---|---|---|---|---|
| TSF (EOP) | 206,225 | 206,225 | 206,225 | 206,225 |
| Occupied SF (EOP) | | | 200,000 | 200,000 |
| Physical Occupancy (EOP) | | | 97.0% | 97.0% |
| Economic Occupancy* | | | 98.4% | 98.4% |

| Non-Commercial |
|---|
| Total #Units (EOP) |
| #Occupied Units (EOP) |
| Leased Units (EOP) |
| Physical Occupancy |
| Economic Occupancy* |

*Economic Occupancy: Revenue Received/Gross Potential Revenues.*
*Gross Potential: Leased Units @ Lease Rates + Non-Income Producing @ Market*

418 — Periods

| | Prior Year Ended: December 31, 1999 | Budget: 2000 | Last 12 Months: June 99–May 00 | Current NOI | PSF |
|---|---|---|---|---|---|
| 410 — INCOME | | | | | |
| Commercial Gross Potential Rent | | | 5,291,750 | 5,291,750 | 25.66 |
| Less: Commercial Loss | | | (85,169) | (186,750) | (0.91) |
| Base Rent | 5,278,810 | 5,300,000 | 5,206,581 | 5,105,000 | 24.75 |
| Tax Recovery | 95,964 | 99,806 | 94,583 | 90,200 | 0.44 |
| Insurance Recovery | 24,495 | 25,476 | 24,873 | 24,700 | 0.12 |
| Op. Cost Recovery | – | – | – | – | – |
| Other Recovery | – | – | – | – | – |
| NOI Adjustments–Total Recoveries | | | | – | – |
| Subtotal–Recoveries | 120,459 | 125,282 | 119,456 | 114,900 | 0.56 |
| Amortized TI's Total | – | – | – | – | – |
| Commercial Income | 5,399,269 | 6,425,282 | 5,326,037 | 5,219,900 | 25.31 |
| Other Income | 283,984 | 290,000 | 288,437 | 288,437 | 1.40 |
| Percent Rent Income | – | – | – | – | – |
| Effective Gross Income | 5,683,263 | 5,715,282 | 5,614,474 | 5,508,337 | 26.71 |
| 412 — OPERATING EXPENSES | | | | | |
| Taxes | 328,074 | 332,000 | 330,988 | 330,988 | 1.60 |
| Utilities | 470,934 | 475,000 | 476,474 | 476,474 | 2.31 |
| Insurance | 26,904 | 27,000 | 26,944 | 26,944 | 0.13 |
| General & Administrative | 326,935 | 330,000 | 321,778 | 321,778 | 1.56 |
| Professional Fees & Services | – | – | – | – | – |
| Repairs & Maintenance | 343,268 | 340,000 | 347,998 | 347,998 | 1.69 |
| Advertising & Promotion | – | – | – | – | – |
| Payroll | – | – | – | 426 – | – |
| Management Fees | 167,237 | 168,000 | 164,979 | 164,979 | 0.80 |
| | – | – | – | – | – |
| Reserve $/SF $/Unit | | | | | – |
| Total Expenses | 1,663,352 | 1,672,000 | 1,669,161 | 1,669,161 | 8.09 |

FIG. 8A

| | | | | | |
|---|---|---|---|---|---|
| 414 — NET OPERATING INCOME | 4,019,901 | 4,043,282 | 3,945,313 | 3,839,176 | 18.62 |
| Debt Service | – | – | – | – | – |
| Capital Improvements | – | – | – | – | – |
| Tenant Improvements | – | – | – | – | – |
| Leasing Commissions | – | – | – | – | – |
| Other Non-Operating Expenses | – | – | – | – | – |
| Total Non-Operating Expense | – | – | – | – | – |
| 416 — NET CASH FLOW | 4,019,901 | 4,043,282 | 3,945,313 | 3,839,176 | 18.62 |

420 — Comments:

FIG. 8B

Project Alpha Portfolio                                                       XYZ Office Building

U/W NOI AUDIT SUMMARY

Office: Stamford, CT  
Property Location: Anytown, CT  
Date of Audit: 06/20/00

Prepared By: _____  
Reviewed & Approved By: _____

522 —

| | | |
|---|---|---|
| TSF (EOP) | 206,225 | 206,225 |
| Physical Occupancy | 97.0% | |
| Economic Occupancy | 96.5% | 96.5% |

| Non-Commercial |
|---|
| Total #Units (EOP) |
| |
| Physical Occupancy |
| Economic Occupancy* |

*Economic Occupancy: Revenue Received/Gross Potential Revenues.  
Gross Potential: Leased Units @ Lease Rates + Non-Income Producing @ Market

| 518 — Headings | Current NOI | U/W Adjustments | U/W NOI | PSF — 524 |
|---|---|---|---|---|
| 510 — INCOME | | | | |
| Commercial Gross Potential Rent | 5,291,750 | – | 5,291,750 | 25.66 |
| Less: Commercial Loss | (186,750) | – | (186,750) | (0.91) |
|   Base Rent | 5,105,000 | – | 5,105,000 | 24.75 |
|   Tax Recovery | 90,200 | | | |
|   Insurance Recovery | 24,700 | | | |
|   Op. Cost Recovery | – | | | |
|   Other Recovery | – | | | |
|   NOI Adjustments—Total Recoveries | – | | | |
|     Subtotal—Recoveries | 114,900 | – | 114,900 | 0.56 |
|   Amortized TI's Total | – | – | – | – |
| Commercial Income | 5,219,900 | – | 5,219,900 | 25.31 |
| Other Income | 288,437 | – | 288,437 | 1.40 |
| Percent Rent Income | – | – | – | – |
| Effective Gross Income | 5,508,337 | – | 5,508,337 | 26.71 |
| 512 — OPERATING EXPENSES | | | | |
|   Taxes | 330,988 | – | 330,988 | 1.60 |
|   Utilities | 476,474 | – | 476,474 | 2.31 |
|   Insurance | 26,944 | – | 26,944 | 0.13 |
|   General & Administrative | 321,778 | – | 321,778 | 1.56 |
|   Professional Fees & Services | – | – | – | – |
|   Repairs & Maintenance | 347,998 | – | 347,998 | 1.69 |
|   Advertising & Promotion | – | – | – | – |
|   Payroll | – | – | – | – |
|   Management Fees | 164,979 | (164,979) — 526 | – | – |
| | – | – | – | – |
|   Reserve $/SF $/Unit | | | – | |
| Total Expenses | 1,669,161 | (166,979) | 1,504,182 | 7.29 |

FIG. 9A

| 514 — NET OPERATING INCOME | 3,839,176 | 164,979 | 4,004,155 | 18.62 |
| --- | --- | --- | --- | --- |
| Debt Service | – | – | – | – |
| Capital Improvements | – | – | – | – |
| Tenant Improvements | – | – | – | – |
| Leasing Commissions | – | – | – | – |
| Other Non-Operating Expenses | – | – | – | – |
| Total Non-Operating Expense | – | – | – | – |
| 516 — NET CASH FLOW | 3,839,176 | 164,979 | 4,004,155 | 18.62 |

520 — Comments:

FIG. 9B

*Project Alpha Portfolio*             *ABC Apartments*

CURRENT NOI AUDIT SUMMARY

| | | | |
|---|---|---|---|
| Office: | Stamford, CT | Prepared By: | |
| Property Location: | Anytown, CT | Reviewed & Approved By: | |
| Date of Audit: | 06/20/00 | | |

622 —

| Commercial | | | | |
|---|---|---|---|---|
| TSF (EOP) | | | | |
| Occupied SF (EOP) | | | | |
|   Physical Occupancy (EOP) | | | | |
|   Economic Occupancy* | | | | |
| Non-Commercial | | | | |
| Total #Units (EOP) | 253 | 253 | 253 | 253 |
| #Occupied Units (EOP) | | | 251 | 251 |
| Leased Units (EOP) | | | 250 | 250 |
|   Physical Occupancy | | | 99.2% | 99.2% |
|   Economic Occupancy* | | | 95.2% | 95.2% |

*Economic Occupancy: Revenue Received/Gross Potential Revenues.*
*Gross Potential: Leased Units @ Lease Rates + Non-Income Producing @ Market*

| 618 — Periods | Prior Year Ended: December 31, 1999 | Budget: 2000 | Last 12 Months: June 99–May 00 | Current NOI | Per Unit — 624 |
|---|---|---|---|---|---|
| 610 — INCOME | | | | | |
| Non-Commercial Gross Potential Rent | | | 2,940,000 | 2,940,000 | 1,620.55 |
| Less: Non-Commercial Loss | | | (140,652) | (140,652) | (555.94) |
| Non-Commercial Income | 2,778,846 | 2,934,273 | 2,799,348 | 2,799,348 | 1,064.62 |
|   Base Rent | – | – | – | – | |
|   Tax Recovery | – | – | – | – | |
|   Insurance Recovery | – | – | – | – | |
|   Op. Cost Recovery | – | – | – | – | |
|   Other Recovery | – | – | – | – | |
|   NOI Adjustments–Total Recoveries | | | | – | |
|     Subtotal–Recoveries | – | – | – | – | |
|   Amortized TI's Total | | | | – | |
| | – | – | – | – | |
| Other Income | 348,647 | 357,245 | 374,582 | 343,394 | 1,357.29 |
| Percent Rent Income | – | – | – | – | – |
| Effective Gross Income | 3,127,693 | 3,291,518 | 3,173,910 | 3,142,742 | 12,421.91 |
| 612 — OPERATING EXPENSES | | | | | |
|   Taxes | 537,700 | 590,000 | 533,079 | 547,246 | 2,163.03 |
|   Utilities | 238,498 | 232,218 | 235,569 | 235,569 | 931.10 |
|   Insurance | 26,798 | 24,461 | 25,118 | 26,000 | 102.77 |
|   General & Administrative | 54,226 | 48,678 | 54,160 | 54,160 | 214.07 |
|   Professional Fees & Services | – | – | – | – | – |
|   Repairs & Maintenance | 379,328 | 351,850 | 366,023 | 376,023 | 1,486.26 |
|   Advertising & Promotion | – | – | – | – | – |
|   Payroll | 339,336 | 368,978 | 356,694 | 356,694 | 1,409.86 |
|   Management Fees | 76,192 | 82,288 | 81,658 | 81,656 | 322.75 |
| | – | – | – | – | – |
|   Reserve $/SF $/Unit | – | – | – | – | – |
| Total Expenses | 1,654,077 | 1,698,473 | 1,652,299 | 1,677,348 | 6,629.83 |

FIG. 10A

| | | | | | |
|---|---|---|---|---|---|
| 614 — NET OPERATING INCOME | 1,473,616 | 1,593,045 | 1,521,611 | 1,465,394 | 5,792.07 |
| Debt Service | – | – | – | – | – |
| Capital Improvements | – | – | – | – | – |
| Tenant Improvements | – | – | – | – | – |
| Leasing Commissions | – | – | – | – | – |
| Other Non-Operating Expenses | – | – | – | – | – |
| Total Non-Operating Expense | – | – | – | – | – |
| 616 — NET CASH FLOW | 1,473,616 | 1,593,045 | 1,521,611 | 1,465,394 | 5,792.07 |

620 — Comments:

*Project Alpha Portfolio*                                    *ABC Apartments*

| U/W NOI AUDIT SUMMARY |
|---|

Office: _____              Prepared By: _____
Property Location: Anytown, CT       Reviewed & Approved By: _____
Date of Audit: 06/20/00

TSF (EOP)

Physical Occupancy
   Economic Occupancy

722 —

| Non-Commercial | | |
|---|---|---|
| Total #Units (EOP) | 253 | |
| Physical Occupancy | 99.2% | |
| Economic Occupancy* | 95.2% | 95.2% |

*Economic Occupancy: Revenue Received/Gross Potential Revenues.
Gross Potential: Leased Units @ Lease Rates + Non-Income Producing @ Market 718 — Headings

| | Current NOI | U/W Adjustments | U/W NOI | Per Unit — 724 |
|---|---|---|---|---|
| 710 — INCOME | | | | |
| Non-Commercial Gross Potential Rent | 2,940,000 | – | 2,940,000 | 11,620.55 |
| Less: Non-Commercial Loss | (140,652) | – | (140,652) | (555.94) |
| Non-Commercial Income | 2,799,348 | – | 2,799,348 | 11,064.62 |
|   Base Rent | – | – | – | |
|   Tax Recovery | – | | | |
|   Insurance Recovery | – | | | |
|   Op. Cost Recovery | – | | | |
|   Other Recovery | – | | | |
|   NOI Adjustments–Total Recoveries | – | | | |
|     Subtotal–Recoveries | – | – | – | |
|   Amortized TI's Total | – | – | – | |
| Other Income | 343,394 | – | 343,394 | 1,357.29 |
| Percent Rent Income | – | – | – | – |
| Effective Gross Income | 3,142,742 | – | 3,142,742 | 12,421.91 |
| 712 — OPERATING EXPENSES | | | | |
|   Taxes | 547,246 | – | 547,246 | 2,163.03 |
|   Utilities | 235,569 | – | 235,569 | 931.10 |
|   Insurance | 26,000 | – | 26,000 | 102.77 |
|   General & Administrative | 54,160 | – | 54,160 | 214.07 |
|   Professional Fees & Services | – | – | – | – |
|   Repairs & Maintenance | 376,023 | – | 376,023 | 1,486.26 |
|   Advertising & Promotion | – | – | – | – |
|   Payroll | 356,694 | – | 356,694 | 1,409.86 |
|   Management Fees | 81,656 | (81,656) | – | – |
| | – | – | – | – |
| | – | – | – | – |
|   Reserve $/SF $/Unit | | | | – |
| Total Expenses | 1,677,348 | (81,656) | 1,595,692 | 6,307.08 |

FIG. 11A

| 714 | NET OPERATING INCOME | 1,465,394 | 81,656 | 1,547,050 | 6,114.82 |
| | Debt Service | – | – | – | – |
| | Capital Improvements | – | – | – | – |
| | Tenant Improvements | – | – | – | – |
| | Leasing Commissions | – | – | – | – |
| | Other Non-Operating Expenses | – | – | – | – |
| | Total Non-Operating Expense | – | – | – | – |
| 716 | NET CASH FLOW | 1,465,394 | 81,656 | 1,547,050 | 6,114.82 |

720 — Comments:

FIG. 11B

Project Alpha Portfolio                                          Consolidation

800

| CONSOLIDATED NOI AUDIT SUMMARY |
|---|

Office:  
Property Location: Various  
Date of Audit: 06/20/00

Prepared By:  
Reviewed & Approved By:

822 —

| Commercial | | |
|---|---|---|
| TSF (EOP) | 206,225 | 206,225 |
| Occupied SF (EOP) | 200,000 | 200,000 |
| Physical Occupancy (EOP) | 97.0% | 97.0% |
| Economic Occupancy* | 98.4% | 98.4% |

| Non-Commercial | | |
|---|---|---|
| Total #Units (EOP) | 253 | 253 |
| #Occupied Units (EOP) | 251 | 251 |
| Leased Units (EOP) | 250 | 250 |
| Physical Occupancy | 99.2% | 99.2% |
| Economic Occupancy* | 95.2% | 95.2% |

*Economic Occupancy: Revenue Received/Gross Potential Revenues.  
Gross Potential: Leased Units @ Lease Rates + Non-Income Producing @ Market 818 —— Periods

| | Last 12 Months | Current NOI | U/W Adjustments | U/W NOI | PSF | Per Unit |
|---|---|---|---|---|---|---|
| 810 —— INCOME | | | | | | |
| Non-Commercial Gross Potential Rent | 2,940,000 | 2,940,000 | – | 2,940,000 | | 11,620.55 |
| Commercial Gross Potential Rent | 5,291,750 | 5,291,750 | – | 5,291,750 | 25.86 | |
| Less: Non-Commercial Loss | (140,652) | (140,652) | – | (140,652) | | (555.94) |
| Less: Commercial Loss | (85,169) | (186,750) | – | (186,750) | (0.91) | |
| Non-Commercial Income | 2,799,348 | 2,799,348 | – | 2,799,348 | | 11,064.62 |
|   Base Rent | 5,206,561 | 5,105,000 | – | 5,105,000 | 24.75 | |
|   Tax Recovery | 94,583 | 90,200 | – | – | – | |
|   Insurance Recovery | 24,873 | 24,700 | – | – | – | |
|   Op. Cost Recovery | – | – | – | – | – | |
|   Other Recovery | – | – | – | – | – | |
|   NOI Adjustments–Total Recoveries | – | – | – | – | – | |
|     Subtotal–Recoveries | 119,456 | 114,900 | – | 114,900 | 0.56 | |
|   Amortized TI's Total | – | – | – | – | – | |
| Commercial Income | 5,326,037 | 5,219,900 | – | 5,219,900 | 25.31 | |
| Other Income | 662,999 | 631,831 | – | 631,831 | 3.06 | 2,497.36 |
| Percent Rent Income | – | – | – | – | – | – |
| Effective Gross Income | 8,788,384 | 8,651,079 | – | 8,651,079 | 28.38 | 13,561.97 |
| 812 —— OPERATING EXPENSES | | | | | | |
|   Taxes | 864,067 | 878,234 | – | 878,234 | 4.26 | 3,471.26 |
|   Utilities | 712,043 | 712,043 | – | 712,043 | 3.45 | 2,814.40 |
|   Insurance | 52,062 | 52,944 | – | 52,944 | 0.26 | 209.26 |
|   General & Administrative | 375,938 | 375,938 | – | 375,938 | 1.82 | 1,485.92 |
|   Professional Fees & Services | – | – | – | – | – | – |
|   Repairs & Maintenance | 714,021 | 724,021 | – | 724,021 | 3.51 | 2,861.74 |
|   Advertising & Promotion | – | – | – | – | – | – |
|   Payroll | 356,694 | 356,694 | – | 356,694 | 1.73 | 1,409.86 |
|   Management Fees | 246,635 | 246,635 | (246,635) | – | – | – |
|   Test | – | – | – | – | – | – |
|   Test | – | – | – | – | – | – |
|   Reserve | – | – | – | – | – | – |
| Total Expenses | 3,321,460 | 3,346,509 | (246,635) | 3,099,874 | 15.03 | 12,252.47 |

FIG. 12A

| | | | | | | |
|---|---|---|---|---|---|---|
| 814 — NET OPERATING INCOME | 5,466,924 | 5,304,570 | 246,635 | 5,551,205 | 13.34 | 1,309.51 |
| Debt Service | – | – | – | – | – | – |
| Capital Improvements | – | – | – | – | – | – |
| Tenant Improvements | – | – | – | – | – | – |
| Leasing Commissions | – | – | – | – | – | – |
| Other Non-Operating Expenses | – | – | – | – | – | – |
| Total Non-Operating Expense | – | – | – | – | – | – |
| 816 — NET CASH FLOW | 5,466,924 | 5,304,570 | 246,635 | 5,551,205 | 13.34 | 1,309.51 |

*FIG. 12B*

METHOD AND PRODUCT FOR CALCULATING A NET OPERATING INCOME AUDIT AND FOR ENABLING SUBSTANTIALLY IDENTICAL AUDIT PRACTICES AMONG A PLURALITY OF AUDIT FIRMS

CROSS REFERENCE TO RELATED APPLICATION

This is a continuation of prior U.S. patent application Ser. No. 09/731,008, filed Dec. 7, 2000 now U.S. Pat. No. 7,353,228.

BACKGROUND OF THE INVENTION

1. Field of the Invention

The present invention relates to real estate property investment techniques and more particularly, to the performance of audits for a plurality of real estate properties and in particular, to a method and computer program product for enabling substantially identical current net operating income audit practices among a plurality of audit firms so that resulting audits calculated by the firms can be efficiently evaluated by a common investment entity.

2. Description of Related Art

The determination of current net operating income (NOI) of a commercial property is a key factor in the underwriting process for new loans or modifications of existing loans. A general definition of the net operating income of a property is the income projected by the income-producing property after deducting losses for vacancy, collection and operating expenses. In more detail, net operating income for any period is the gross income less expenses, including property taxes, reasonable maintenance and operating expenses, and the amortized cost of capital improvements. Gross income is generally defined as the total of the gross rents lawfully collectible from a property, plus any other considerations received or receivable for, or in connection with, the use or occupancy of rental units and housing services (including other consideration such as, for example, from laundry, parking, or any other facilities or fees).

Net Operating Income (NOI) audits are performed as part of the due diligence process for most new investment transactions and to audit on-going property performance. Although an NOI audit can involve a variety of processes, typically, the NOI audit involves: 1) a review of all or a significant sample of leases, 2) a revenue reconciliation, 3) cash receipts testing, and 4) operating income and expense analyses. The findings disclosed during the NOI audit enable the investment entity to make a reliable determination of in-place net operating income, which provides the basis for a sound investment decision.

Usually, NOI audits are performed in connection with commercial properties such as, for example, office, industrial, retail properties and non-commercial properties, such as multifamily and self storage properties, although other types of properties can be involved.

A procedure found to be generally acceptable by the industry calls for NOI audits to be conducted after receipt of a signed loan (or equity) application and good faith deposit, but before submission of a request for credit approval. In such a procedure, transactions which are approved subject to the completion of NOI audits must have NOI audits completed and approved prior to initial transaction funding.

Depending on how the investment entity is organized, NOI audits may be performed by approved outside accounting firms, or audit firms, having a contractual relationship with the investment entity, so that the investment entity is able to meet its investment targets and cycle time objectives. In such instances, audit firms would be approved on the basis of, for example, staff size, qualifications of staff members, real estate experience, capabilities concerning turnaround time, and fees. Real estate deal leaders or due diligence coordinators of the investment entity typically provide the outside audit firms with all information and support which is necessary to conduct a complete and efficient audit. Conversely, the audit results delivered in return should conform to the investment entity's expectations and standards so that the results can be accepted with the presumption that all required parameters and assumptions are included in the underlying calculations.

This becomes a serious problem in instances where numerous audit firms are involved, each performing one or more respective property audits, and especially where each firm is geographically separate from the investment entity location and possibly philosophically at odds with the prevailing philosophy of the investment entity. Inevitably, individual practices evolve, or creep into, the NOI audit procedure conducted by contractor audit firms, the effect of which, in some instances, may be difficult for the investment entity to initially recognize, and may contribute to errors in investment judgment, as defined by the policies and objectives of the investment entity. Such individual practices, if not explicitly indicated, may remain undetected, or be misunderstood, during review and comparative evaluation by the investment entity. For example, undetected assumptions made in the underwriting NOI calculation might include, but are not limited to, lower than current occupancy rates, changes in tax liability, or growth of capital reserves. Such assumptions might be incorporated into the NOI calculation, but not given an appropriate level of visibility or notice and go undetected by the reader. This can lead to disastrous consequences in terms of evaluating potential real estate investment. On a more prosaic level, the format, arrangement, and content of the audit reports can vary widely among audit firms, leading, at least, to difficulty of review by the investment entity and inconsistency in results.

A primary object of the present invention is to provide a system and method for achieving uniform implementation of policy, procedure, current NOI calculation, and reporting among a plurality of audit firms having a reporting relationship with a common investment entity.

Another object of the present invention is to provide an NOI audit model, which includes an interactive computer program that makes readily available to the user during the performance of an audit, an audit policy, guidelines, detailed instructions and definitions, together with an NOI calculating module and a reporting module, that are amenable to orderly extension to accommodate unique aspects of one or more investment properties.

Still another object of the present invention is to provide in a single computer program a global audit model that includes a Current NOI calculation module and an Underwriter NOI calculation module which operate from a common data model.

A further object is to provide the global audit model of the present invention in the form of a product to be distributed over a network such as the Internet or by a recording on stored data media.

SUMMARY OF THE INVENTION

These and other objects of the present invention are provided by a method, a data processing system and a computer program product for enabling substantially identical current net operating income (NOI) audit practices employed by a plurality of audit firms operating independently of each other and having a reporting relationship with a common investment entity. A uniformity of procedure is accomplished, which combines audit procedures, required document checklists, data input, schedule output, and "helpful hints" and definitions, together with an interactive global NOI audit computation model in one integrated, interactive application. Advantageously, it is the integrated aspect of these components provided in an interactive, computer-based form, together with an NOI audit computation model, that enables a single investment entity to obtain uniform audit results from a plurality of audit firms, each performing audits of a respective commercial real estate property by using a deployed copy of the computer program. As a result of each respective audit firm having interactive access to all standards, procedures, and methodologies during the course of operating, and providing input to, the NOI audit model, the investment entity is able to obtain consistent audit results across all respective audits, with respect to data considered, underlying assumptions, accounting techniques, and report format, even though the audit firms function on an independent basis.

The foregoing objects of the present invention are met by a method and product that identifies a specific set of information according to specified criteria and definitions. The information is inputted into a computer program for calculation and development of a Current NOI set of values. The same program is used to subject the Current NOI set of values to a second set of underwriter information for calculation of an Underwriter NOI set of values.

According to the present invention, a standard, global NOI audit model is provided as part of each copy of a deployed computer program. The global NOI audit model is an analytical tool which has been designed to facilitate the process of auditing and audit reporting. As such, the model contains a listing of audit procedures, data input areas, standard reports and schedules including Current and Underwriting NOI summaries, and clarifying notes to schedules and input areas.

The global model is not intended to replace the skilled auditor, and therefore, does not function as an expert system capable of operation by one not trained in the audit field. The global NOI audit model is used by the audit firm responsible for performance of the audit of a specific real estate property to determine a set of Current NOI values and to identify and communicate potential issues that may be of interest to the investment entity employer. The same global NOI audit model is also used by the investment entity to determine a corresponding set of Underwriting NOI values for that same real estate property. The set of Underwriting NOI values are calculated from quantitative departures from the set of Current NOI values, and both are expressed in terms of respective Current NOI reports and Underwriting NOI reports produced by the computer program of the present invention.

Use of deployed copies of the same computer program, while possibly simplistic in itself, rises to a unique application in the commercial real estate investment industry, which is inherently subjective and replete with independent practices and procedures, and therefore, subject to subtle, but important, differences in the calculated results, depending on the choice of data, assumptions made, specific calculation model used, and a myriad of other options available to the audit firm performing the initial NOI audit. Advantageously, implementation of the specific NOI audit model of the present invention, which requires adherence to a set of standards, definitions, and procedures, together with common deployment of such a system to independent audit firms, enables the investment firm recipient of the results produced by those firms to perform a reasoned decisional analysis of several commercial properties to determine in which property an investment should be made or maintained.

The system and method of the present invention may be used by a plurality of audit firms employed by a single investment entity, each performing respective audits of respective properties and completing summary reports and schedules as directed by the global NOI audit model. Notwithstanding the use of the global NOI audit model, however, it is understood that auditors are expected to use sound judgment and practices in conducting the NOI audit. The auditors are also expected to disclose, by way of audit documentation provided by the computer program, any deviations from the procedures outlined in the model. In addition, provision is made so that any further exhibits or schedules necessary to support or explain operating performance or deviations from the procedures outlined in the NOI model are disclosed and included with the final audit documentation.

The method of the present invention includes the step of deploying a computer program that includes global NOI audit model, together with standards, procedures, documentation, and reporting requirements in interactive, digital form. The computer program is adapted for receiving a first respective input data in connection with the respective real estate property and generating an associated respective Current NOI audit report. To accomplish this, the respective audit firm using the deployed computer program enters data according to the prescribed procedures and documentation. The specific fields and screen arrangements of the program are such that all respective audit firms, although each individually auditing a relatively unique property, with potentially unique attributes, nevertheless, identify a consistent set of input parameters and apply them in a consistent way, as driven by the global audit model of the present invention. The system is flexible in that the report format can be extended in an orderly fashion to accommodate the peculiarities of any given audit situation. The investment entity is thus assured that each respective Current NOI audit report received in digital form is developed by substantially identical audit practices, procedures and assumptions.

The method of the present invention further includes the step of generating a respective Underwriting NOI audit report for each received respective Current NOI audit report. This Underwriting audit report is calculated from a second respective input data applied to the global NOI audit program by the investment entity. This second respective input data includes assumed values corresponding to, and overriding, selected portions of the first respective input data. In other words, the assumed values are "what-if" values that take into consideration significant departures from the underlying data supporting the Current NOI audit calculation. Such departures include, for example, a lower, more conservative occupancy rate of a rental property, an increase in tax rates applicable to the property, or a sudden drop in capital reserves. The resulting NOI calculation, called the "Underwriting NOI" calculation, is inherently a conservative calculation due to the nature of the input, and may comprise a series of such calculations, each incorporating a different set of assumptions. Of course, an "optimistic" report may be derived by using an Underwriting NOI calculation with "what if" values reflecting maximum or high occupancy, lowering of tax rates, or an increase in capital reserves.

The second respective input data is input by the investment entity to a copy of the global NOI audit computer program configured to be running a particular Current NOI audit report provided to the investment entity by an audit firm. The corresponding respective Underwriting NOI audit report is developed under the input and direction of the investment entity, and, taken together, all such respective Underwriting NOI audit reports share common auditing assumptions and data collection practices by virtue of software-driven common practices. This uniformity of audit practices is critical to the investment entity practice of comparing such reports to determine, or maintain, an investment strategy.

The present invention further includes the method of use from the perspective of an audit firm using the present invention. In that context, the method of the present invention includes the step of inputting respective first input data by at least one of the plurality of audit firms to a respective deployed copy of the computer program, wherein the respective first input data is in connection with an associated real estate property. The method further includes the step of providing to the investment entity at least one respective generated Current NOI audit report generated by the respective copy of the deployed computer program used by the audit firm and reflecting the received respective first input data.

The present invention also includes the interactive computer program configured to operate as above-described, and as a product including the program stored in memory or on data media, such as magnetic or optical data storage media, or alternatively, transmitted over a network, such as, for example, a closed network such as a local area network or an Intranet, or an open network such as the Internet.

BRIEF DESCRIPTION OF THE DRAWINGS

The above and other features of the present invention and the attendant advantages will be readily apparent to those having ordinary skill in the art and the invention will be more easily understood from the following detailed description of the preferred embodiments of the present invention, taken in conjunction with the accompanying drawings.

FIG. 6 illustrates an example user-accessible menu of Data Input areas logically arranged in four Sections A-D according to the present invention;

FIG. 7 illustrates an example user-accessible input screen according to the present invention;

FIGS. 8A and 8B illustrate an example Current NOI Audit Summary report showing example data associated with a commercial rental Office Building;

FIGS. 9A and 9B illustrate an example of an Underwriter NOI Audit Summary report corresponding to the report shown in FIGS. 8A and 8B;

FIGS. 10A and 10B illustrate an example Current NOI Audit Summary report showing example data associated with a non-commercial rental Apartment complex;

FIGS. 11A and 11B illustrate an example of an Underwriter NOI Audit Summary report corresponding to the report shown in FIGS. 10A and 10B;

FIGS. 12A and 12B illustrate an example Consolidation NOI Audit Summary report according to the present invention.

DESCRIPTION OF THE PREFERRED EMBODIMENTS

Figure 1:
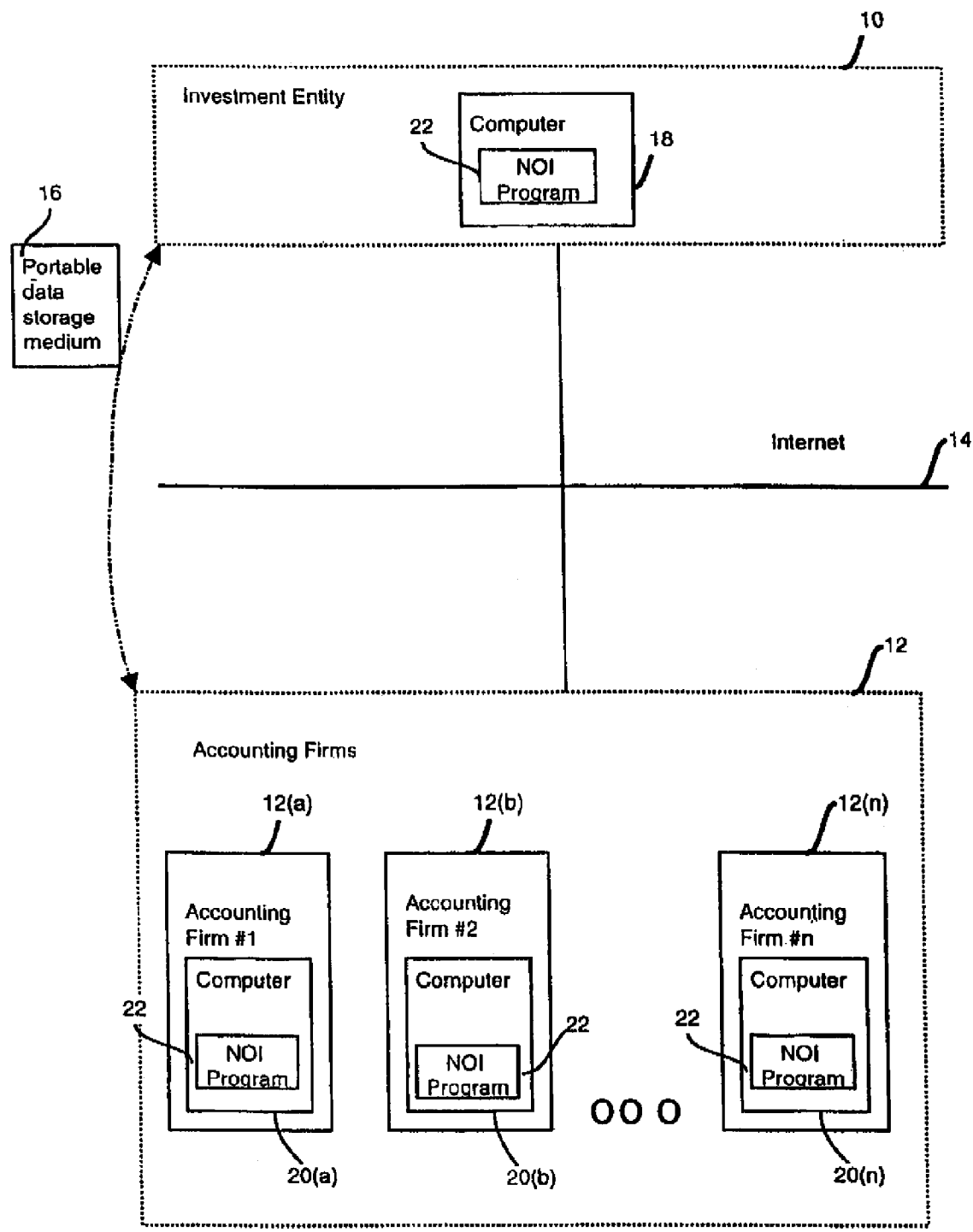
FIG. 1 is a simplified block diagram of a system configured to employ the present invention.

FIG. 1 is a simplified block diagram of an environment configured to employ the present invention, showing investment entity 10 and a group of audit firms 12, including firms 12(a, b, . . . n), each having a reporting relationship with investment entity 10 and being in data communication with entity 10. The data communication can take any form, and preferably, is a digital communication including the Internet 14, or alternatively, a portable data storage medium 16 such as, for example, a magnetic disk or CDROM. Investment entity 10 includes a computer 18 and each audit firm has a respective computer 20(a, b, . . . n), all computers 18 and 20(a, b, . . . n) running copies of the same global NOI audit program 22. Alternatively, Internet 14 can be, for example, a closed network such as a local area network, a wide area private network.

Figure 2:
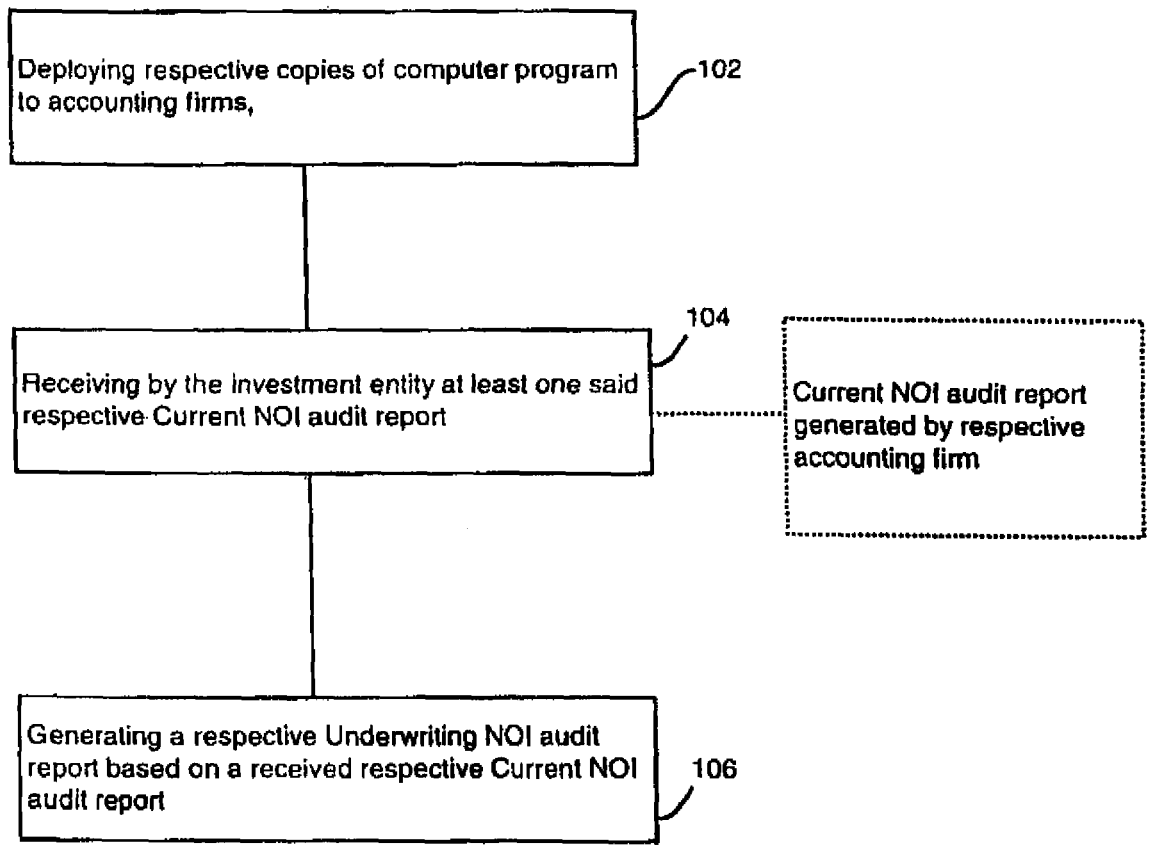
FIG. 2 is a simplified flowchart of the method according to the present invention.

FIG. 2 is a simplified flowchart of method 100 according to the present invention, showing the method performed by the investment entity 10. Method 100 enables an investment entity 10 to ensure that procedurally substantially identical current net operating income (NOI) audit practices are employed by the plurality of audit firms 12(a, b, . . . n) having an operating relationship with investment entity 10. Each of the plurality of audit firms 12(a, b , . . . n) is arranged to conduct a respective audit of a respective real estate property for the purpose of generating an associated set of Current NOI values.

The first step 102 is deploying respective copies of the global NOI audit computer program 22 to audit firms 12(a, b, . . . n). The deployed copies of the computer program 22 include an interactive global NOI audit model and digital standards, procedures, documentation, and reporting requirements. The deployed computer program 22 is adapted for receiving a respective first input data entered by an associated audit firm 12(a, b, . . . n) in connection with the respective real estate property. The computer program 22 is configured to generate a respective Current NOI audit report associated with the respective real estate property, based on the entered input data.

The second step 104 is receiving by the investment entity 10 at least one respective Current NOI audit report generated by the global NOI audit computer program 22, and third step 106 is generating a respective Underwriting NOI audit report based on a received respective Current NOI audit report. Preferably, the respective Underwriting NOI report is generated by investment entity 10, using the global NOI audit computer program 22. Another agency, such as a designated audit firm, could generate the respective Underwriting NOI report using the NOI audit computer program 22, and then report the results to the investment entity.

Figure 3:
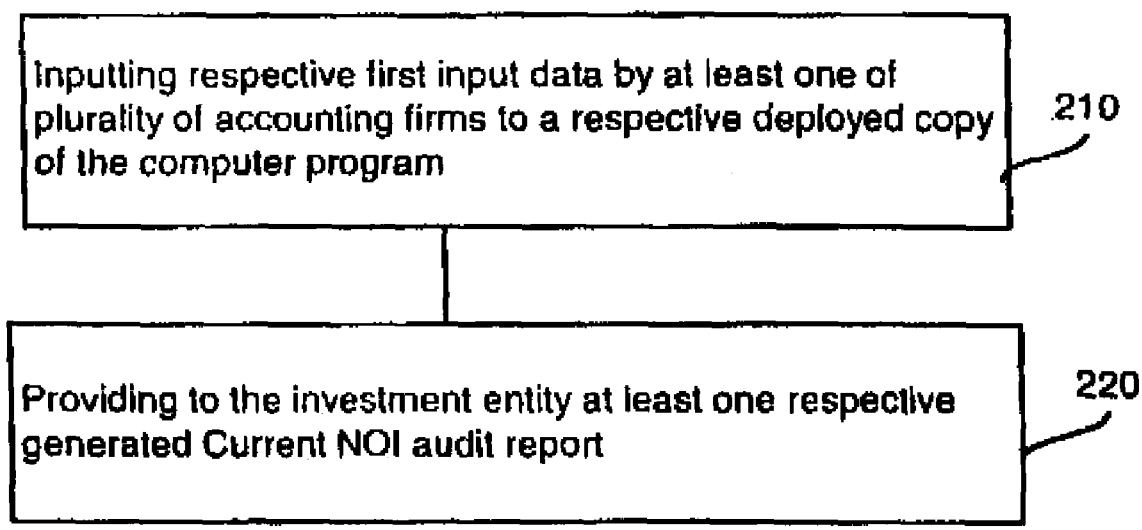
FIG. 3 is a simplified flowchart of method 200 showing the method performed by each audit firm according to the present invention.

FIG. 3 is a simplified flowchart of method 200 according to the present invention, showing the method performed by each audit firm 12(a, b, . . . n) that has a relationship with investment entity 10. Step 210 is inputting respective first input data by at least one of plurality of audit firms to a respective deployed copy of the computer program. Step 220 is providing to the investment entity 10 at least one respective generated Current NOI audit report.

Upon receipt of Current NOI audit reports, each of which typically includes workpapers indicating the underlying data and commentary, deal leaders or due diligence coordinators of the investment entity thoroughly review the audit reports. The Current NOI audit reports (and particularly risks to a property's income and expenses) are discussed with underwriters to assist them in formulating an associated Underwriting NOI. The underwriters consider the Current NOI audit reports in structuring transactions and disclose results in credit requests for evaluation in the credit approval process.

Figure 4:
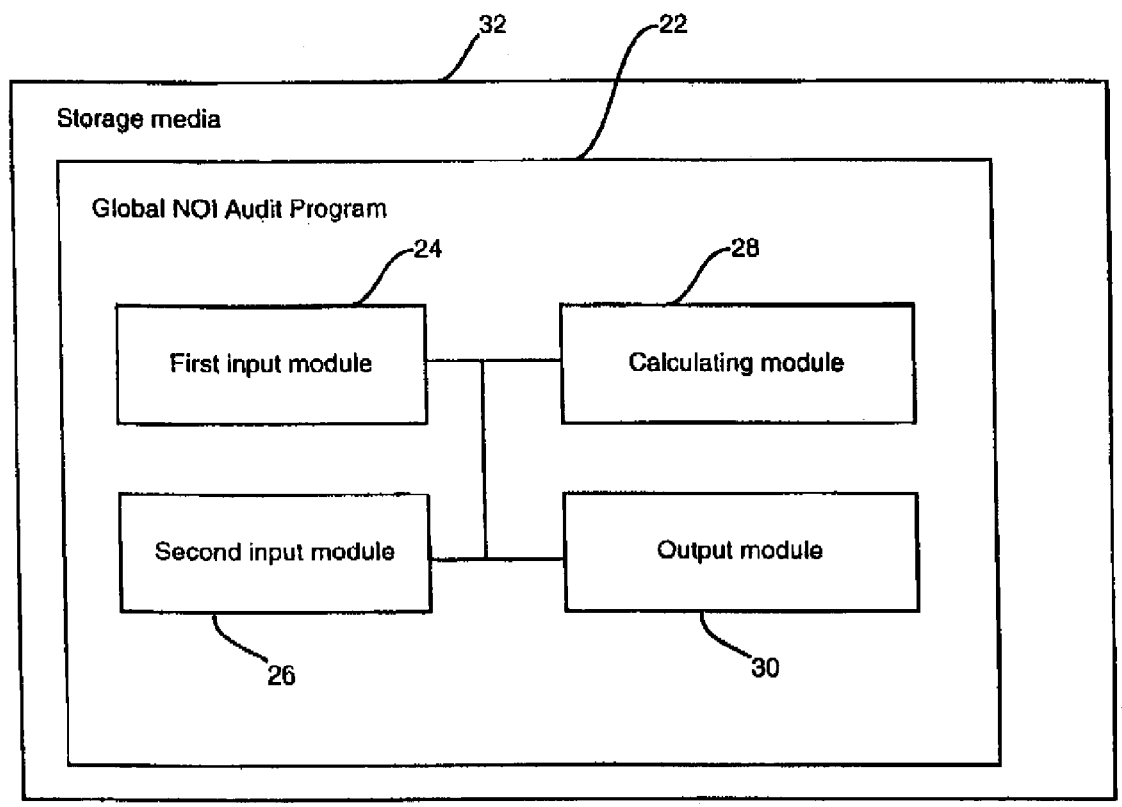
FIG. 4 is a simplified schematic of the contents of storage media product including a stored interactive computer program according to the present invention.

FIG. 4 is a simplified schematic of the contents of a storage media product 32 including a stored interactive computer program 22 for generating at least one underwriting net operating income (NOI) set of values based on a respective Current NOI set of values determined as part of a corresponding NOI audit of a real estate property. Program 22 includes a first input module 24 for receiving input of at least one first information and generating from that at least one first information a Current NOI set of values. Program 22 also includes a second input module 26 for receiving input of at least one second information and combining the at least one first and the second information to generate at least one calculated set of values. Program 22 further includes a calculating module 28 for calculating from the at least one calculated set of values an Underwriting NOI set of values. And lastly, program 22 includes an output module 30 for output of at least one of the Current NOI set of values and the Underwriting NOI set of values. In the preferred embodiment, modules 24-30 are embodied in a spreadsheet program, and as such, are an integrated function of the spreadsheet computation model. Other well known program models are envisioned, such as one or more data bases operating in conjunction with a commercially available programming language, such as, for example, Visual C++(TM of Microsoft Corporation).

In the preferred embodiment, the first information provided by the audit firm includes, for example, static and historical information including deal data, general asset data, and prior data, as well as income information and expense information. The income information includes optional commercial rental income data and commercial lease testing data, optional non-commercial lease testing data, commercial recovery analysis data, percentage rent testing data, and non-commercial income data. Other income data can also be included.

In the preferred embodiment, the expense information includes real estate tax bill data, tax bill data, insurance data, utilities data, repair and maintenance data, service contract testing data, management fee data, general and administrative data, advertising and promotion data, professional fees and services data, payroll expense data, payroll testing data, and non-operating expense data. Other expense data can be included.

The second information includes at least one data value representing an adjusted value provided by the underwriter. The first and second information are automatically combined by application of the at least one data value to all pertinent stored values of the computer program for automatic generation of at least one Underwriting NOI set of values.

In contrast to some traditional real estate property investment underwriting techniques, the method of the present invention is based on the premise that the due diligence responsibility is held by the underwriting organization, which preferably is a part of the investment entity. In contrast, certain underwriting aspects traditionally have been performed by the audit firm that performs the audit, thereby mixing the audit firm's responsibilities among Current NOI and Underwriting NOI calculations. In the present invention, the clear demarcation of responsibilities provides for clarity, accountability and consistency. In addition, the audit firms identify economic (e.g., rent increases) and non-economic (e.g., lease clause) "red flags" in conformance with data input areas of the Current NOI audit portion of the global NOI audit program. Where appropriate, the audit firm provides to the investment entity an advance notice of a critical finding in advance of final audit results.

The auditor is responsible for obtaining a rent roll, for tying economic terms to leases, and documenting all "red flag" items in connection with all leases. Later, after the Current NOI audit report is delivered to the investment entity, the underwriter of the investment entity reviews all major leases plus any additional leases deemed appropriate and highlighted for review by the audit firm.

In the preferred embodiment of the present invention, the global NOI audit program is obtained by programming a spreadsheet, such as, for example, Excel (Trademark of Microsoft Corporation). Sections of the model are organized by "worksheets", which are identified by "worksheet tabs", which are known navigation tools for access to the main sections of the program having the headings: Documentation, Data Input Area, Output Schedules, and Supplier Survey/Scorecard. The user is able to quickly navigate among the individual output schedules and their corresponding input areas, or to other main sections of the program, by clicking on a Navigation Menu, which is identified by any known graphic input, or by a specific keyboard entry. Clicking on the standard "magnifying glass" icon found in spreadsheets enables the user to "drill down" from a cell on the output schedule to the related input cell.

Pop-up Notes are accessible by the user, wherever the known "?" icon is shown, to access clarifying notes. These notes are accessible in the input area (both section labels and specific cells), as well as the output schedules. These notes are detailed and comprehensive so that they provide the auditor with close guidance in connection with the data input cell associated with the corresponding note. Ready access to these notes facilitates the overall object of achieving consistent audit procedures across a plurality of audit firms having a relationship with a common investment entity, according to the present invention.

Other features of the preferred embodiment include the known drop-down menu feature, which enables the user to perform additional functions, such as, for example, adding a column of data input on a new asset, selecting an asset for screen display or print, printing selected output schedules in known ways and consolidation of multiple assets. A known recalculate capability is also available under user control, which enables the user to cause the spreadsheet to recalculate all calculations.

Preferably, the input screens are arranged for vertical data input, including one column per property. The preferred model includes a multi-property capability of up to 250 assets. The format of input is ordered to follow the order of the output schedules. There can be a varying number of detail lines and preferably, 100 commercial tenants, 50 non-commercial tenants, 14 lines for other income, advertising expense, and professional fees. Other alternative data entries and format arrangements suitable for audit program data input are envisioned. In addition to data, the auditor also has the capability of entering clarifying comments to be displayed on the applicable schedules.

Figure 5:
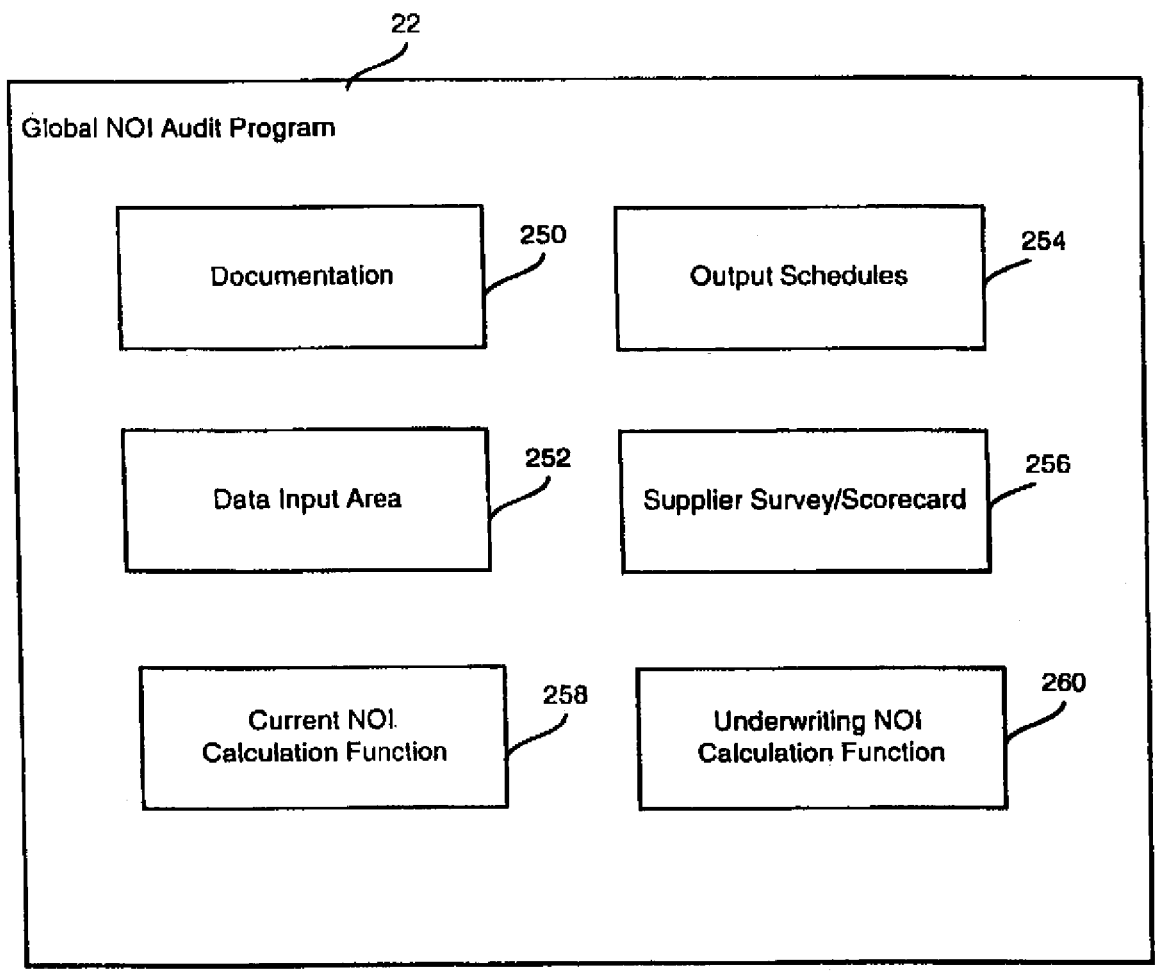
FIG. 5 is a simplified block diagram of the four major sections of the global audit program accessible by the user according to the present invention.

FIG. 5 is a simplified block diagram of the four major sections of the global audit program 22, which are accessible on an interactive basis by the user through either the first input module 24 or the second input module 26, shown in FIG. 4. Audit program 22 includes Documentation section 250, Data Input Area 252, Output Schedules 254, Supplier Survey/Scorecard 256, Current NOI Calculation Function 258, and Underwriter NOI Calculation Function 260.

The Documentation section 250 includes procedures taking the form of outlines of the audit procedures to be performed. It includes a notes section which includes clarifying notes by schedule and by input cell. These notes are accessible from the input area, output schedules, or by a graphically displayed sheet tab, in conformance with known Windows (TM of Microsoft Corporation) techniques. The Documentation section 250 also includes a document checklist, which identifies data to be received from the borrower.

The second major area, the Data Input Area 252, includes all data and comment input, which preferably is entered in a single input area. Data is not directly entered in the output schedules, in order to preserve internal programming integrity.

The third major area, the Output Schedules area 254, includes twenty six output schedules for display of the audit results. These are tabulated as schedule numbers shown in Table 1.

TABLE 1

| Schedule # | Schedule Name |
|---|---|
| 1.0 | Commercial Rental Income/Lease Testing |
| 1.1 | Commercial Rental Income Potential Adjustments |
| 2.0 | Non-Commercial Lease testing |
| 3.0 | Cash Testing |
| 4.0 | Recovery Analysis - Rent Roll vs. Calculated |
| 4.1 | Recovery Analysis - Recovery Pool Calculation |
| 5.0 | Percentage Rent Testing |
| 6.0 | Non-Commercial Rental Income |
| 7.0 | Other Income |
| 8.0 | Real Estate Tax Bill Analysis |
| 8.1 | Real Estate Tax Expense Analysis |
| 9.0 | Insurance Expense Analysis |
| 10.0 | Utilities Expense Analysis |
| 11.0 | Repairs And Maintenance Expense Analysis |
| 11.1 | Service Contract Testing |
| 12.0 | Management Fees |
| 13.0 | General And Administrative Expense Analysis |
| 14.0 | Advertising And Promotion Expense Analysis |
| 15.0 | Professional Fees And Services Expense Analysis |
| 16.0 | Payroll Expense Analysis |
| 16.1 | Payroll Testing |
| 17.0 | Flexible #1 Expense Analysis |
| 17.1 | Flexible #2 Expense Analysis |
| 18.0 | Non-Operating Expenses |

Summaries
Current NOI Summary - By Property and By Multi-property Consolidation
Underwriting NOI Summary - By Property and By Multi-Property Consolidation The fourth major area, Supplier Survey/Scorecard 256, includes a supplier feedback on the audit process, including contact with the investment entity, contact with the borrower, and the global audit program. The Supplier Scorecard 256 captures metrics on price, timeliness, compliance and accuracy, which are input by the investment entity.

FIG. 6 illustrates an example user-accessible menu of Data Input areas 300 logically arranged in four Sections A-D. Each input schedule, such as "Schedule 1.0 & 1.1 Commercial Rental Income/Lease Testing" 302, directly corresponds to an output screen of the same schedule number and title, described above. Clicking on the known "+/−" icon feature adjacent to any specific data input schedule title results in a "drill down" to the detailed entries, shown in FIG. 7 (described below), corresponding to that schedule. Clicking again on that icon brings the user back to the listing of schedules shown in FIG. 6.

Section A, titled Static and Historical Information, enables entry of information such as, for example, portfolio name, prepared by, audit date, asset name, reviewed by, and other similar information. Section A also enables input of general asset information such as address and other specifics identifying the asset to be audited. Section A further includes prior information, such as, for example, indication of whether the Current NOI calculation is based on YTD annualized data, and input of other prior period data such as prior period total rental income, prior period total tax recovery income, corresponding budgeted values and last 12 months data, such as rental income, tax recovery income, insurance recovery income, and total operating cost recover income, as well as other values, to be used in part as a basis for calculation of the Current NOI.

Section B includes income related input schedules and Section C includes expense related input schedules. Section D includes input areas relating to NOI audit summary comments.

FIG. 7 illustrates an example user-accessible "Schedule 1.0 & 1.1, Commercial Rental Income/Lease Testing" input screen 310. Screen 310 is obtained by clicking on the "+/−+" icon adjacent to the "Schedule 1.0 &. 1.1" line 302 found in Section B of screen 300. Screen 310 includes all items pertinent to Commercial Rental Income/Lease Testing, and provides data entry fields for multiple properties. As an example, "Property 1", 312, is shown. The specific entries for screen 310 are obtained according to traditional auditing methodologies, and the entries shown in FIG. 7 are by way of example.

All remaining schedules 1-18 are obtained in the same way as schedule 1.0 shown in FIG. 7.

FIGS. 8-12 illustrate an example "Project Alpha" Portfolio consisting of commercial office rental space represented by an "XYZ Office Building" and a non-commercial residence rental space represented by an "ABC Apartment Complex", illustrated in terms of NOI Audit Summary reports. The example data shown for the Current NOI Audit Summary report for each rental property provides the basis for the adjusted data shown for the corresponding Underwriter NOI Audit Summary report. The Consolidation Summary report reflects the information for the entire "Project Alpha".

FIGS. 8A and 8B illustrate an example Current NOI Audit Summary report 400 showing example data associated with the commercial rental "XYZ Office Building". FIG. 8B shows a continuation of Summary 400 shown in FIG. 8A. The summary shown in FIGS. 8A and 8B summarizes the input, comments, and results calculated by the NOI audit computational model, and includes values for detail components of each of Income 410, Operating Expenses 412, Net Operating Income 414, and Net Cash Flow 416, corresponding to periods 418 including Prior Year Ending on a specific date, Budget, Last 12 Months, and Current NOI. Area 420 presents comments entered by the auditor. Area 422 includes occupancy summary in terms of square footage, which is used to calculate the per square foot value found in column 424, for each line entry.

FIGS. 9A and 9B illustrate an example of a corresponding Underwriter NOI Audit Summary report 500 in connection with the same "XYZ Office Building" for which the Current NOI Audit Summary report is shown in FIGS. 8A and 8B. FIG. 9B shows a continuation of Summary 500 shown in FIG.

9A. The summary shown in FIGS. 9A and 9B summarizes amendments made by the Underwriter to the data shown in the corresponding Current NOI Audit Summary report shown in FIGS. 8A and 8B. Adjusted values include values for the detail components of each of Income 510, Operating Expenses 512, Net Operating Income 514, and Net Cash Flow 516, corresponding to headings 518 including Current NOI, U/W Adjustments, U/W NOI and Per square Foot values. Area 520 presents comments entered by the auditor. Area 522 includes square footage summary which is used to calculate the Per Square Foot value found in column 524, for each line entry.

Values appearing in the Current NOI Summary report 400 of FIG. 8A are shown as adjusted by the Underwriter in Underwriter NOI Audit Summary report 500, shown in FIG. 9A. For example, in FIG. 8A, the "Management Fees" having a value of $164,979 (reference numeral 426), are shown as a credit in the Underwriter Summary report shown in FIG. 9A (reference numeral 526).

FIGS. 10A and 10B illustrate an example Current NOI Audit Summary report 600 showing example data associated with the non-commercial rental "ABC Apartment Complex". FIG. 10B shows a continuation of Summary 600 shown in FIG. 10A. The summary shown in FIGS. 10A and 10B summarizes the input, comments, and results calculated by the NOI audit computational model, and includes values for detail components of each of Income 610, Operating Expenses 612, Net Operating Income 614, and Net Cash Flow 616, corresponding to periods 618 including Prior Year Ending on a specific date, Budget, Last 12 Months, and Current NOI. Area 620 presents comments entered by the auditor. Area 622 includes occupancy summary in terms of Per Unit data which is used to calculate the Per Unit value found in column 624, for each line entry.

FIGS. 11A and 118 illustrate an example of a corresponding Underwriter NOI Audit Summary report 700 in connection with the same "ABC Apartment Complex" for which the Current NOI Audit Summary report is shown in FIGS. 10A and 10B. FIG. 11B shows a continuation of Summary 700 shown in FIG. 11A. The summary shown in FIGS. 11A and 11B summarizes amendments made by the Underwriter to the data shown in the corresponding Current NOI Audit Summary report shown in FIGS. 10A and 10B. Adjusted values include values for the detail components of each of Income 710, Operating Expenses 712, Net Operating Income 714, and Net Cash Flow 716, corresponding to headings 718 including Current NOI, U/W Adjustments, U/W NOI and Per Unit values. Area 720 presents comments entered by the auditor. Area 722 includes square footage summary which is used to calculate the Per Square Foot value found in column 724, for each line entry.

FIGS. 12A and 12B illustrate an example Consolidation NOI Audit Summary report 800 showing example data associated with the example XYZ and ABC properties. Selected columns of data from the Current and Underwriter NOI Summary reports are listed to enable easy comparison and analysis. FIG. 12B shows a continuation of summary 800 shown in FIG. 12A. The following rows of data are drawn from the two summary reports: Income 810, Operating Expenses 812, Net Operating Income 814, and Net Cash Flow 816, corresponding to periods 818 including Last 12 Months, Current NOI, U/W Adjustments, U/W NOI, Per Square Foot values and Per Unit values. Area 822 includes both the square footage and occupied unit summaries.

While this invention has been described in conjunction with specific embodiments thereof, it is evident that many alternative modifications and variations will be apparent to those skilled in the art. Accordingly, the preferred embodiments of the invention as set forth herein are intended to be illustrative, not limiting. Various changes may be made without departing from the true spirit and scope of the invention as defined in the following claims.

The invention claimed is:

1. A storage medium having computer program instructions stored thereon, the medium comprising:
    instructions to deploy a copy of a computer program to each of a plurality of audit firms, each of the audit firms operating independently of each other and having a reporting relationship with a common investment entity, each of the plurality of audit firms conducting an audit of a real estate property and generating an associated set of current net operating income (NOI) values, each copy of said computer program including an interactive global NOI audit model and user-viewable standards, procedures, documentation, and reporting requirements, the computer program operating to receive a first input data associated with the respective real estate property and to generate a respective current NOI audit report associated with each of the real estate properties, each of the audit firms having a computer system comprising a plurality of computers, the deploying resulting in each of the computer systems executing the computer program;
    instructions to use at least some of the computer systems to input the respective first input data by at least some of the audit firms to the computer program; and
    instructions to receive by the investment entity a plurality of current NOI audit reports, each of the reports being generated by execution of a copy of the computer program on one of the computer systems and reflecting the received associated first input data, wherein all the received current NOI audit reports have been developed by substantially similar audit practices resulting from the audit firms using the interactive global NOI audit model and user-viewable standards, procedures, documentation, and reporting requirements.

2. The medium of claim 1, further comprising:
    instructions to generate a respective underwriting NOI audit report based on each of at least some of said received current NOI audit reports, the respective underwriting NOI audit report being calculated from a second respective input data including identified values corresponding to selected portions of the first respective input data; and
    instructions to input the second respective input data by the investment entity into a copy of the computer program configured to run said respective current NOI audit report, wherein all respective underwriting NOI audit reports are developed by substantially identical audit practices.

3. The medium of claim 2, further comprising instructions to generate a respective consolidated NOI summary report, the consolidated NOI summary report including data derived from the respective underwriting NOI audit report and the respective current NOI audit report.

4. A system, comprising:
    a copy of a computer program deployed to each of a plurality of audit firms, each of the audit firms operating independently of each other, each of the plurality of audit firms conducting an audit of a real estate property and generating an associated set of current net operating income (NOI) values, each copy of the computer program including an interactive global NOI audit model and user-viewable standards, procedures, documentation, and reporting requirements, the computer program operating to receive a first input data associated with the respective real estate property and to generate a respective current NOI audit report associated with each of the real estate properties, a computer system comprising a plurality of computers at each of the audit firms, each computer system at each of the audit firms executing the deployed computer program, wherein at least some of the computer systems are used to input the respective first input data by at least some of the audit firms to the computer program; and a common investment entity, each of the audit firms having a reporting relationship with the common investment entity, receiving a plurality of current NOI audit reports, each of the reports being generated by execution of a copy of the computer program on one of the computer systems and reflecting the received associated first input data, wherein all the received current NOI audit reports have been developed by substantially similar audit practices resulting from the audit firms using the interactive global NOI audit model and user-viewable standards, procedures, documentation, and reporting requirements.

5. The system of claim 4, further comprising:

generating a respective underwriting NOI audit report based on each of at least some of the received current NOI audit reports, the respective underwriting NOI audit report being calculated from a second respective input data including identified values corresponding to selected portions of the first respective input data; and inputting the second respective input data by the investment entity into a copy of the computer program configured to run the respective current NOI audit report, wherein all respective underwriting NOI audit reports are developed by substantially identical audit practices.

6. The system claim 5, further comprising generating a respective consolidated NOI summary report, the consolidated NOI summary report including data derived from the respective underwriting NOI audit report and the respective current NOI audit report.

7. The system of claim 4, wherein the computer program is deployed by transmitting said computer program over a network.

8. The system of claim 4, wherein the computer program is deployed by recording the computer program on digital data storage media and distributing the media.

* * * * *